US012035214B2

(12) United States Patent
Fish et al.

(10) Patent No.: US 12,035,214 B2
(45) Date of Patent: Jul. 9, 2024

(54) CONTROLLING AND MONITORING DEVICES USING NEAR FIELD COMMUNICATION

(71) Applicant: Accenture Global Solutions Limited, Dublin (IE)

(72) Inventors: Mark Edward Fish, Cheshire (GB); Guy Richard Talbot, Verona, NJ (US)

(73) Assignee: Accenture Global Solutions Limited, Dublin (IE)

( * ) Notice: Subject to any disclaimer, the term of this patent is extended or adjusted under 35 U.S.C. 154(b) by 229 days.

(21) Appl. No.: 17/324,866

(22) Filed: May 19, 2021

(65) Prior Publication Data

US 2021/0368317 A1    Nov. 25, 2021

Related U.S. Application Data

(60) Provisional application No. 63/027,562, filed on May 20, 2020.

(51) Int. Cl.
*H04W 4/80* (2018.01)
*G06F 16/955* (2019.01)
(Continued)

(52) U.S. Cl.
CPC .......... *H04W 4/80* (2018.02); *G06F 16/955* (2019.01); *H04W 4/023* (2013.01); *H04W 4/029* (2018.02)

(58) Field of Classification Search
CPC ....... H04W 4/80; H04W 4/029; H04W 4/023; G06F 16/955
(Continued)

(56) References Cited

U.S. PATENT DOCUMENTS 10,120,517 B2 * 11/2018 Corrion ............ G06F 3/041661
2009/0193500 A1 * 7/2009 Griffin .................... G07F 17/32
726/2
(Continued)

FOREIGN PATENT DOCUMENTS

CN      110646029 A      1/2020
EP       2506203 A1      10/2012
(Continued)

OTHER PUBLICATIONS

European Patent Office, Communication, Partial European Search Report issued for European Patent Application No. 21174685.4, dated Aug. 10, 2021, 21 pages.
(Continued)

*Primary Examiner* — April G Gonzales
(74) *Attorney, Agent, or Firm* — Norton Rose Fulbright US LLP

(57) ABSTRACT

Embodiments of the present disclosure leverage near field communication (NFC) technology to provide dynamic and interactive monitoring of an environment. NFC devices may be used to check items in and out of a storage facility, obtain readings from instruments or other machinery present in the environment (e.g., to perform tests on the items, etc.), track movement of users and items within the environment, and to prompt users with information about the environment, such as information about the instruments or machinery currency being used to perform operations with respect to one or more items checked out to the user. Additionally, the NFC device may be used to configure the instruments with appropriate settings for the particular item(s) for which the instrument is currently being used or for other purposes.

20 Claims, 4 Drawing Sheets

(51) Int. Cl.
*H04W 4/02* (2018.01)
*H04W 4/029* (2018.01)

(58) Field of Classification Search
USPC .......................................................... 455/41.1
See application file for complete search history.

(56) References Cited

U.S. PATENT DOCUMENTS

| | | | | |
|---|---|---|---|---|
| 2011/0076941 | A1* | 3/2011 | Taveau | G06Q 30/0224 705/40 |
| 2013/0159135 | A1* | 6/2013 | Jones | G06Q 10/08 705/26.8 |
| 2013/0303085 | A1* | 11/2013 | Boucher | H04W 12/069 455/41.1 |
| 2013/0309964 | A1* | 11/2013 | Hall | H04B 5/00 455/41.1 |
| 2013/0314214 | A1* | 11/2013 | Leica | H04W 4/80 340/10.1 |
| 2013/0317924 | A1* | 11/2013 | Bush | G06Q 20/352 705/16 |
| 2014/0149529 | A1* | 5/2014 | McLellan | H04W 4/80 709/213 |
| 2014/0171032 | A1* | 6/2014 | Huang | H04W 4/80 455/414.1 |
| 2014/0187148 | A1* | 7/2014 | Taite | G06F 3/017 455/41.1 |
| 2018/0152443 | A1* | 5/2018 | Henrique Minatel | H04W 76/10 |
| 2019/0180059 | A1* | 6/2019 | Frenz | G06F 16/27 |
| 2019/0373432 | A1* | 12/2019 | Gabriele | H04W 52/0245 |

FOREIGN PATENT DOCUMENTS

| | | |
|---|---|---|
| EP | 2800403 A1 | 11/2014 |
| GB | 2567336 A | 4/2019 |
| KR | 20160104266 A | 9/2016 |
| WO | WO-2012139217 A1 | 10/2012 |
| WO | WO-2016109835 A1 | 7/2016 |
| WO | WO-2017044903 A1 | 3/2017 |
| WO | WO-2018171349 A1 | 9/2018 |
| WO | WO-2018171433 A1 | 9/2018 |
| WO | WO-2018171707 A1 | 9/2018 |

OTHER PUBLICATIONS

European Patent Office, Communication, Extended European Search Report issued for European Patent Application No. 21174685.4, dated Sep. 21, 2021, 21 pages.

Langer, Josef, and Michael Roland. *Anwendungen und Technik von Near Field Communication (NFC)*. Springer, 2010. 276 pages.

China National Intellectual Property Administration, Office Action issued for Chinese Patent Application No. 202110552943.5, dated Sep. 1, 2023, 19 pages.

* cited by examiner

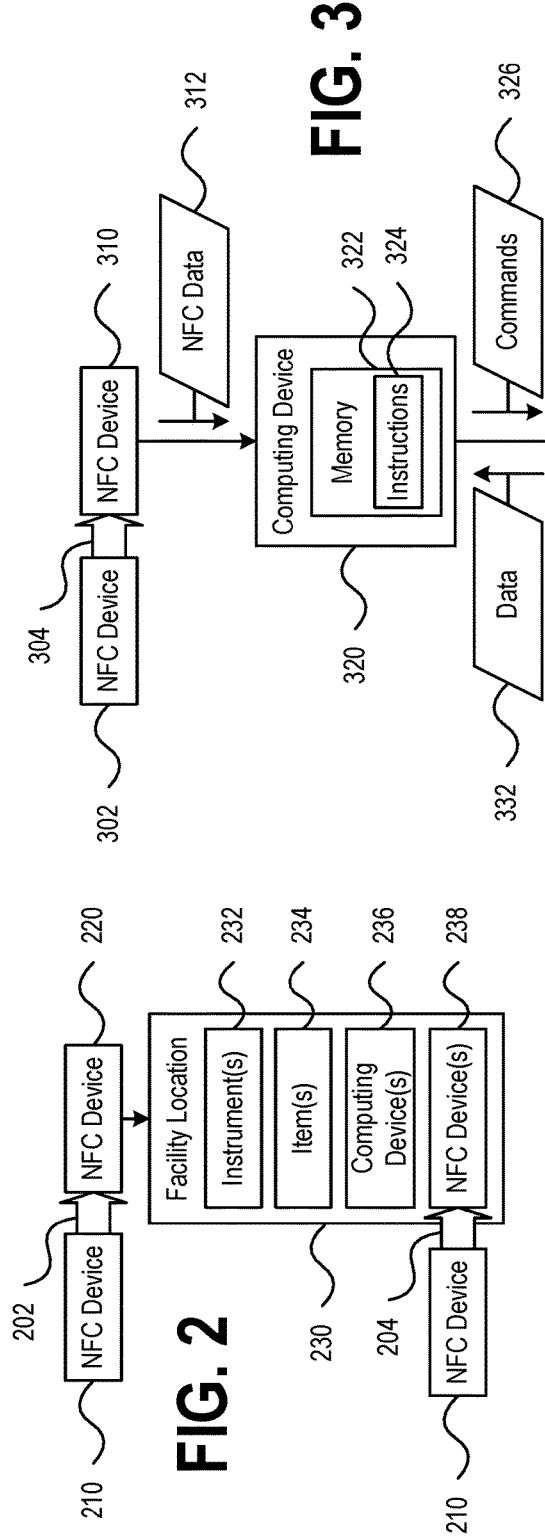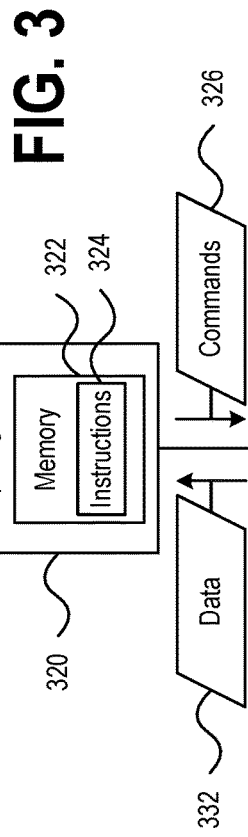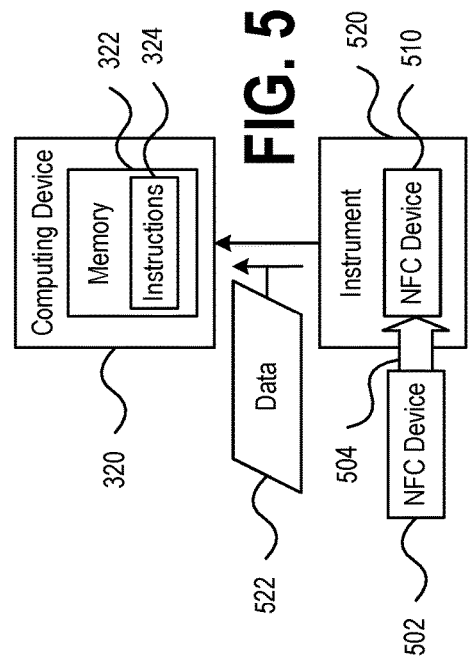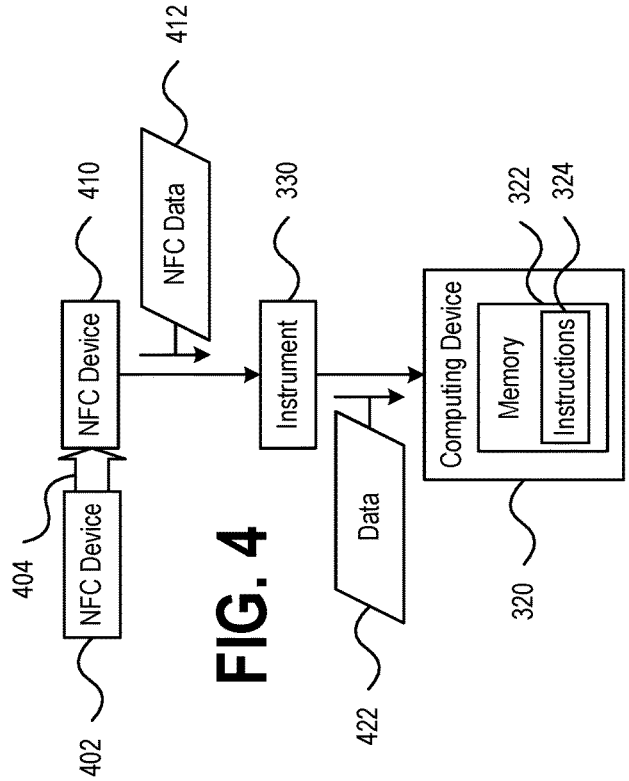

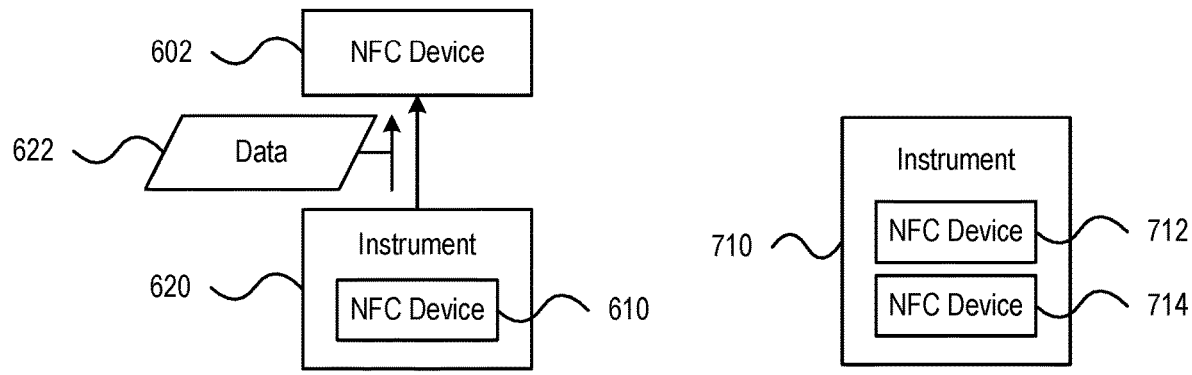
FIG. 6
FIG. 7
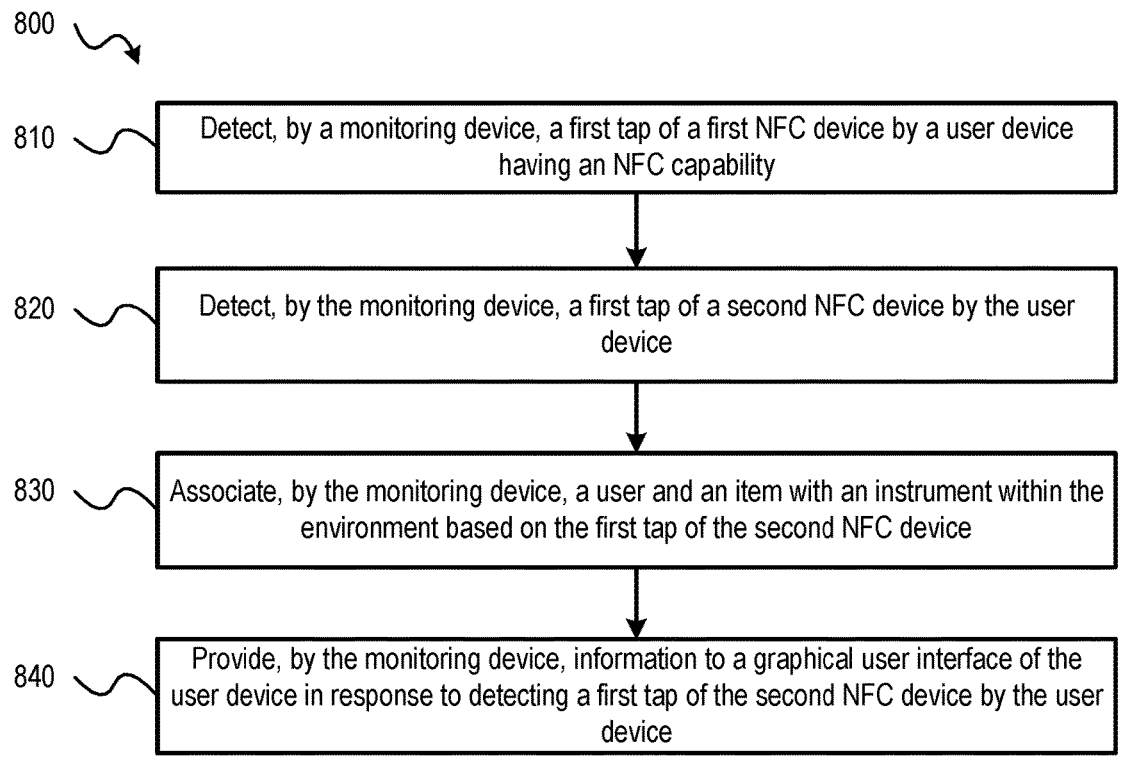
FIG. 8

CONTROLLING AND MONITORING DEVICES USING NEAR FIELD COMMUNICATION

CROSS-REFERENCE TO RELATED APPLICATION

The present application claims the benefit of U.S. Provisional Patent Application No. 63/027,562 filed May 20, 2020, and entitled "SOLUTION TO DIGITALLY TRANSFORM USER EXPERIENCE IN LAB ENABLING SEAMLESS AND SECURE ACCESS TO DATA AND WORKFLOW," the disclosure of which is incorporated by reference herein in its entirety.

TECHNICAL FIELD

The present application relates to tracking and control systems and more specifically to techniques for dynamic and interactive tracking and control of devices in an environment.

BACKGROUND

Presently, there are many industries where tracking movement of physical items takes place. For example, in a manufacturing environment items are produced or assembled, packaged, and stored for subsequent shipment (e.g., to wholesalers, customers, or retailers). The location of manufactured items may be tracked at various points prior to delivering the product to its destination, such as tracking that manufacture of the item is complete, tracking movement of the item from a warehouse or other storage location to a fulfilment center or other location where the product may be stored, and tracking shipment of the item to a destination, such as a location specified by a purchaser of the item.

While the tracking capabilities used in the example scenario above are suitable for simple environments where an item spends most of its time in a dormant state (e.g., sitting in a warehouse, on a truck, etc.), there are many environments where items may be frequently transferred between different locations and actions are taken with respect to the item at each location. One such environment is a laboratory. In laboratory environments items (e.g., samples, liquids, or other materials) may be stored in a storage facility and periodically removed for testing, processing, or other operations. During such operations, the items may be removed from the storage facility and taken to one or more locations within the laboratory environment and at each of the one or more locations various operations involving the items may be performed. To illustrate, an item may be removed from a storage facility and taken to a first station where the item is weighed. Subsequently, the item may be taken to a second station where another operation is performed with respect to the item, such as to remove a portion of the item and subject the removed portion to various chemical tests or other types of testing. Over its lifetime the item may repeat this process many times and the data generated for each operation performed with respect to the item may be tracked. While items may be transported to various locations within in a laboratory environment, merely tracking the location of the item is not very useful—instead, it is the data generated and the processes performed as the item moves through the laboratory environment. Thus, in some environments merely being able to track the location of items, as in the manufacturing example above, is not that useful.

Moreover, in some environments, items may change state as they are processed by devices and instruments at different locations. One example is pharmaceutical or nutritional supplement manufacturing facilities. In such facilities, items may be stored and then removed for use in a production process. As the production process takes place, various ones of the items may be combined, change states, be consumed (e.g., burned, liquefied, solidified, crushed, etc.), or other types of transformations. When such transformations take place, it may be difficult to track each item involved in a process (e.g., since the item may have changed states, been combined to form a new item, or discarded).

An additional problem with existing process monitoring, tracking, and control systems is repeatability. One reason for this is that different users may not perform tasks in the same manner (e.g., different temperatures, quantities, mixing times, etc.) or may perform tasks of the process in a different order or with different steps (e.g., crushing an item using a mortar and pestle instead of a grinder). This can lead to inconsistencies in the process execution can be problematic for some use cases and may result in inconsistencies and/or defects in the outputs of the executed process(es).

SUMMARY

The present application discloses systems, methods, and computer-readable storage media for providing dynamic tracking of items and interactive processes within an environment. In aspects, the environment(s) may include one or more locations where various processes may be performed with respect to an item. Each location may include a near field communication (NFC) enabled device that the user may connect to by tapping an electronic device (e.g., a smartphone, a smartwatch, a personal digital assistant, a tablet computing device, etc.) having NFC capabilities to the NFC device at the location. The NFC device at the location may be a dedicated NFC device or may be integrated with equipment at the location, such as incorporating an NFC device into an instrument or equipment at the location.

In aspects, the NFC devices utilized in embodiments may be configured to provide or facilitate access to functionality associated with a location. For example, an NFC reader device may be located at a storage facility where items are stored and may be used to check items into and out of the storage facility, such as by connecting or "tapping" the NFC enabled user device with the NFC reader device at the storage facility. In addition to providing NFC enabled devices at each location and using NFC enabled user devices to interact with and access the functionality corresponding to each location, items within the environment may be equipped with NFC devices, such as an NFC device enabled sticker or tag that may be applied to the item or a container housing the item. The NFC device associated with the item may be connected to the NFC devices within the environment to identify the item(s) that is currently present at a particular location.

The functionality provided by the NFC reader device may include operations to authenticate the user, identify the item(s) being checked in or out, or other features. NFC reader devices at different locations within the environment may be associated with different functionality, although some or all of the NFC reader devices may provide location tracking capabilities. In some aspects, tapping the user device or item to the reader device may facilitate a sequence of operations, where different taps are associated with different portions of the sequence of operations. For example, an initial tap by the user device may be used to authenticate the user, configure one or more instruments or devices at the location with appropriate permissions (e.g., permissions appropriate for the authenticated user), or other types of functionality. A second tap may be performed with the item to check the item into the location of the NFC reader device. The second tap may cause additional configuration of the instruments or devices, such as to place restrictions or limits on the instruments or devices that are appropriate for the item. A third tap of the NFC reader device may initiate operations of the instrument or device. For example, where the instrument is a digital scale, a third tap of the NFC reader device with either the item or the user device may signify that the item is placed on the digital scale and a reading from digital scale may be recorded to a database. A fourth tap of the NFC reader device may be used to indicate check out the item from the location, which may signify that the instrument or device (e.g., the digital scale in the example above) is now free for others to use.

Network devices may be coupled to at least some of the various NFC devices present in the environment to support operations of embodiments. For example, a tap of an NFC reader device at a particular location may launch an application of the user device, where the application is provided or supported by the network devices. The application may provide various functionality with respect to the instruments and devices at the various locations within the environment, such as to capture readings from the instruments or devices, prompt the user with instructions on operating the instruments or devices, providing warnings to the user (e.g., if a problem is detected), display information about the item, or other types of interactive content to the user. Additionally, the network devices may monitor the various instrument and devices within the environment and record data representative of the interactions between the items, users, and instruments and devices over time. For example, the network devices may be configured to maintain records of which users have checked items out, when users have checked items in, what locations items were transported to within the environment, results of any tests performed by the instruments or devices within the environment, or other information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein:

FIG. 2 is a block diagram illustrating aspects of a system for dynamic and interactive monitoring of an environment in accordance with aspects of the present disclosure;

FIG. 3 is a block diagram illustrating aspects of interacting with a device in accordance with aspects of the present disclosure;

FIG. 4 is a block diagram illustrating additional aspects of interacting with a device in accordance with aspects of the present disclosure;

FIG. 5 is a block diagram illustrating additional aspects of interacting with a device in accordance with aspects of the present disclosure;

FIG. 6 is a block diagram illustrating additional aspects of interacting with a device in accordance with aspects of the present disclosure;

FIG. 7 is a block diagram illustrating additional aspects of interacting with a device in accordance with aspects of the present disclosure;

FIG. 8 is a flow diagram illustrating a method for dynamic and interactive monitoring of an environment in accordance with aspects of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Embodiments of the present disclosure leverage NFC technology to provide dynamic and interactive monitoring of an environment and control of devices within the environment. Interaction between NFC devices may be used to provide information to users, control operations of devices within the environment, track movement of users and items within the environment check items, obtain information from devices within the environment, or other operations. In aspects, devices within the environment may be associated with one or more NFC devices. Some of the NFC devices, or a computing device coupled to the NFC devices, may store information that specifies one or more predetermined actions. Each of the one or more actions may be initiated based on a sequence of interactions between two NFC devices (e.g., an NFC device associated with a user and an NFC device associated with a device within the environment). A user may utilize a device having NFC capabilities (e.g., a smartwatch, smartphone, smartcard, etc.) to interact with NFC devices associated with devices within the environment, such as to bring the device having NFC capabilities within proximity of a NFC device associated with a device within the environment. Each interaction between the NFC devices may trigger a different action by the devices (e.g., the user device or the device within the environment), which may include obtain readings from the device, track movement of users and items within the environment, prompting users with information about the environment, prompting users to capture information about the environment, or other types of operations. Interaction of the NFC devices may also be used to configure the devices within the environment with particular settings, control operations of the device, or control actions by one or more devices that support operations of the device. Additional exemplary aspects of the present disclosure are described in more detail below with reference to FIGS. 1-9.

Figure 1:
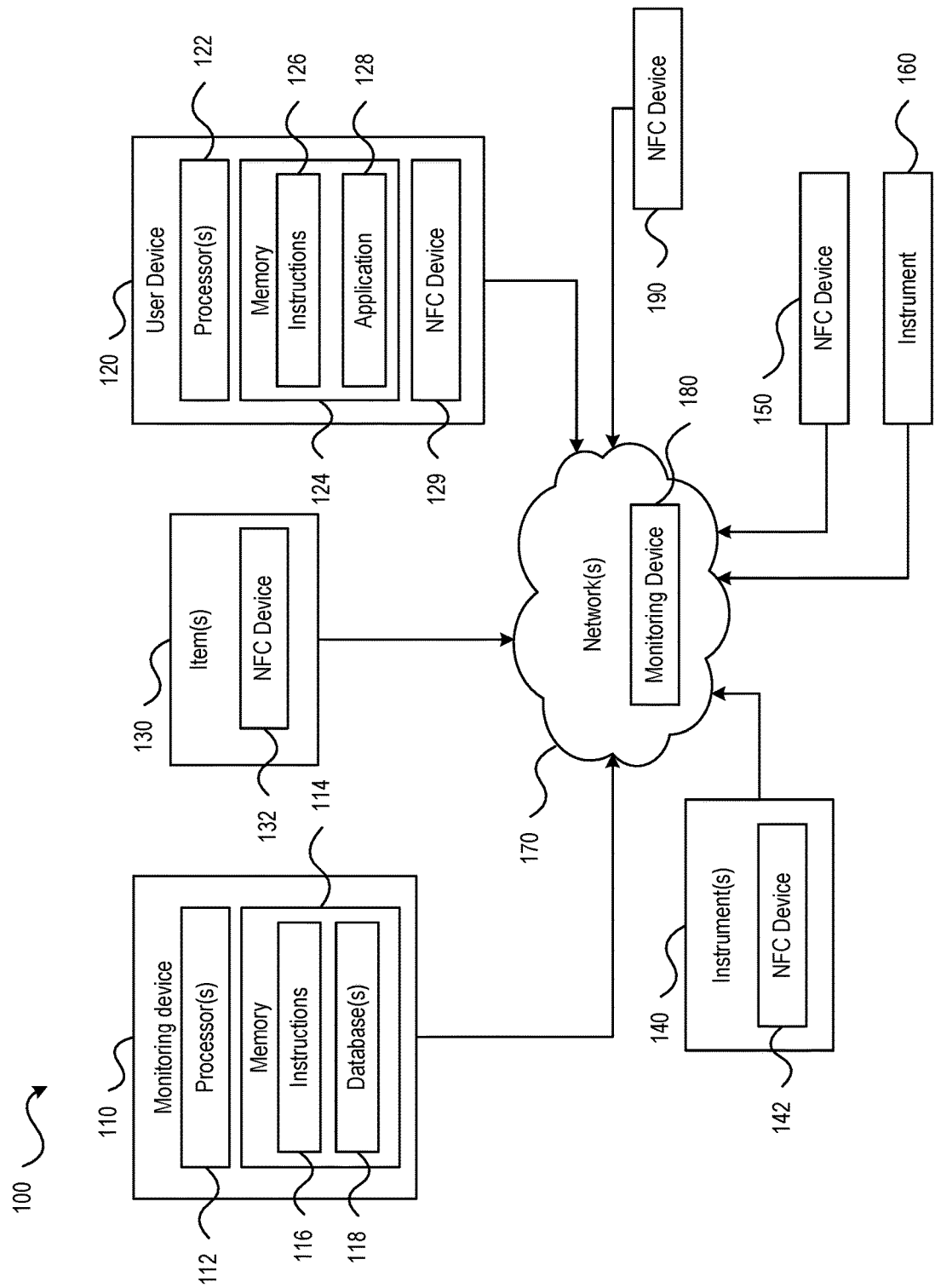
FIG. 1 is a block diagram of a system for dynamic and interactive monitoring of an environment in accordance with aspects of the present disclosure.

Referring to FIG. 1, a block diagram of a system for dynamic and interactive monitoring of an environment in accordance with aspects of the present disclosure is shown as a system 100. The system 100 may include a monitoring device 110, a user device 120, one or more items 130, an instrument 140, an NFC device 150, an instrument 160, and an NFC device 190. The various devices (e.g., the monitoring device 110, the user device 120, the instrument 140, a NFC device 150, the instrument 160, and the instrument 190) of the system 100 may be communicatively coupled to each other via one or more networks 170. It is noted that FIG. 1 illustrates two instruments for purposes of illustration, rather than by way of limitation and that embodiments of the present disclosure may be utilized with environments including more than two devices or instruments.

As shown in FIG. 1, the monitoring device 110 includes one or more processors 112 and a memory 114. Each of the one or more processors 112 of the monitoring device 110 may be a central processing unit (CPU) or other computing circuitry (e.g., a microcontroller, one or more application specific integrated circuits (ASICs), and the like) and may have one or more processing cores. The memory 114 of the monitoring device 110 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 114 may store instructions 116 that, when executed by the one or more processors 112 of the monitoring device 110, cause the one or more processors 112 to perform the operations described herein with reference to the monitoring device 110. Additionally, the memory 114 of the monitoring device 110 may store one or more databases 118. It is noted that in some embodiments, the functionality described herein with respect to the monitoring device 110 may be provided via a cloud-based monitoring device 180. In such an implementation the computing resources (e.g., processors, memory, etc.) and functionality (e.g., software, etc.) of the monitoring device 110 may be disposed in the cloud and may be accessible to the various other devices via the one or more networks 170. Exemplary aspects of the operations of the monitoring device 110 are described in more detail below.

The user device 120 includes one or more processors 122, a memory 124, and an NFC device 129. Each of the one or more processors 122 of the user device 120 may be a CPU or other computing circuitry (e.g., a microcontroller, one or more ASICs, and the like) and may have one or more processing cores. The memory 124 of the user device 120 may include ROM devices, RAM devices, one or more HDDs, flash memory devices, SSDs, other devices configured to store data in a persistent or non-persistent state, or a combination of different memory devices. The memory 124 may store instructions 126 that, when executed by the one or more processors 122 of the user device, cause the one or more processors 122 to perform the operations described with reference to the user device 120. Additionally, the memory 124 of the user device 120 may store one or more applications (not shown in FIG. 1 for simplicity of the drawing), such as a web browser application or a monitoring application associated with the system 100. The user device 120 may be a smartphone, personal digital assistant (PDA), a dongle, a laptop computing device, a tablet computing device, a watch or other wearable device, or other electronic device having NFC communication capabilities (e.g., a smartcard, a fob, and the like). In aspects, the NFC device 129 may include devices operating in accordance with one or more NFC standards, such as an International Organization for Standardization/International Electrotechnical Commission (ISO/IEC) standard (e.g., ISO/IEC 14443, ISO/IEC 18000-3, and the like) or another NFC standard. In some aspects, radio frequency identification (RFID) devices or other types of devices adapted to perform the functionality described herein (e.g., barcode readers or QR code readers). It is noted that while specific examples of devices suitable for providing NFC communication capabilities have been described herein, these specific examples are provided for purposes of illustration, rather than by way of limitation. Accordingly, it is to be understood that other types of NFC devices may also be utilized in embodiments of the present disclosure. Exemplary aspects of the operations of the user device 120 are described in more detail below.

The items 130 may include liquids, biological or other types of materials, gases, animals, electrical components (e.g., components to be tested and/or for conducting testing of other items), chemicals or reagents, or other types of objects or substances that may be present within a monitored environment, such as a laboratory. The items 130 may initially be stored at a storage facility but may checked out to one or more users, as described in more detail below. As illustrated in FIG. 1, each of the items 130 may be associated with an NFC device 132. The NFC device(s) 132 associated with each item 130 may be attached to or proximate a corresponding item 130 or may be integrated within a container used to store the item 130 (e.g., in the case of liquids or other items). In some aspects, the NFC devices 132 may be devices having the NFC communication capabilities described above with reference to the NFC device 129. In additional or alternative aspects, the NFC devices 132 may be non-electronic devices, such as stickers having barcodes (i.e., barcodes that may be read by a barcode or QR code reading device of a user device) and the like.

As illustrated in FIG. 1, devices present within an environment monitored by the monitoring device 110 may include instruments 140, such as scales, temperature sensors, mixers, containers (e.g., beakers, test tubes, etc.), microscopes, imaging devices (e.g., imaging cameras, video cameras, scientific complementary metal-oxide-semiconductor (sCMOS) cameras, and the like), or other types of devices that may be used to perform operations with respect to the items 130. The instruments 140 may be associated with or include NFC devices. For example, the instrument 140 includes an integrated NFC device 142 and the instrument 160 may be associated with the NFC device 150. When NFC devices are integrated with instruments, the NFC devices may be disposed within or attached to a housing of the instrument. When not integrated with an instrument, the NFC devices may be disposed proximate to (e.g., within threshold distance, such as 0.5 meters, 1 meter, or another distance) the corresponding instrument(s). NFC devices of embodiments may include active NFC devices that include circuitry capable of providing information to the tapping device (e.g., the NFC device 129) and/or receiving information from the tapping device (e.g., the user device 120, the instrument(s) 140, or other devices). Additionally or alternatively, NFC devices of embodiments may include passive NFC devices (e.g., barcoded tags, labels, and the like) configured to transmit or otherwise provide data to other devices (e.g., the NFC device 129) but that do not receive data. It is noted that passive NFC devices may include circuitry, but such circuitry may be limited to transmission of data to a NFC device (e.g., the NFC device 129) brought in proximity of or tapped to the passive NFC devices and may not include circuitry to receive data (e.g., from the NFC device 129) and such passive NFC devices may not receive information.

During monitoring, a user, such as a user associated with the user device 120, may desire to perform operations with respect to the item 130 using one or both of the instruments 140, 160. To facilitate such operations, the user may visit the storage facility where items are stored and retrieve the item 130. The user may scan or "tap" the NFC device 129 to the NFC device 190, which may be disposed proximate to an entrance of the storage facility (e.g., near a door). The monitoring device 110 may detect the scan of the NFC device 190 and determine that someone (e.g., the user of the user device 120) has entered the storage facility associated with the NFC device 190 to check-out or check-in an item, such as the item 130.

To check out the item 130, the user may then tap the NFC device 129 at the NFC device 132 corresponding to the item 130, or bring the NFC device 129 within close proximity to the NFC devices 132 corresponding to the item 130. It is noted that the NFC devices 129, 132 may be within close proximity when the NFC devices are separated by less than 1 centimeter (cm), between 1 to 4 cm, between 1 to 10 cm, or another suitable distance depending on the particular NFC devices and their capabilities. In some aspects, when the NFC device 129 is tapped to or brought within close proximity to the NFC device 132, additional data may be exchanged between the NFC device 132 and the user device 120. In aspects, the monitoring device 110 may detect and receive the additional data via the one or more networks 170, such as via transmission of the additional data to the monitoring device 110 from the user device 120. In an aspect, when the item 130 is tapped with the NFC device 129, data may be exchanged that identifies the item 130. In an aspect, the data may include a Uniform Resource Locator (URL) that uniquely identifies the item 130 within the system 100. The URL may be utilized by the user device 120 to present information associated with the item at the user device 120, such as a material safety data sheet (MSDS) or other information (e.g., a web page allowing the user to specify the quantity of the item 130 checked out by the user, etc.). The monitoring device 110 may receive the exchanged data from the user device 120 via the one or more networks 170, such as via an http request transmitted by the user device 120 to the monitoring device 110 based on the URL or information input to a web page associated with the URL by the user via the user device 120. Additional aspects of using URLs with NFC devices in accordance with aspects of the present disclosure are described below. The user may tap the NFC device 129 to the NFC device 190 upon exiting the storage facility. It is noted that while the description above indicates that interaction between the NFC device 129 and the NFC device 190 may be performed as the user enters and exists the storage facility where the item(s) 130 is stored, such examples are provided by way of illustration, rather than by way of limitation and that other mechanisms may be used to track the location of users and items in the system 100. For example, rather than interaction between the NFC device 129 and the NFC device 190, location information may be derived from interaction between the NFC device 129 and the NFC device(s) 132 corresponding to the item(s) 130, which may be stored at a particular location. In such instances, the user's location may be determined by virtue of the interaction between the NFC devices 129, 132, which may indicate the user is at the particular location where the item(s) 130 is stored.

In an aspect, the monitoring device 110 may be configured to provide information to a graphical user interface of the user device 120 in response to communication between the NFC device 129 and another NFC device (e.g., one of the NFC devices 132, 142, 150, 190). For example, in response to a first tap of the NFC device 132 by the NFC device 129, the monitoring device 110 may provide information to the user device 120 for presentation at a graphical user interface presented at a display device (not shown in FIG. 1) of the user device 120. In an aspect, the graphical user interface may be provided by an application 128 stored in the memory 124 of the user device 120, such as a graphical user interface displayed within a browser-based application or a monitoring application. It is noted that in some aspects the presentation of information at the graphical user interface may be performed by the user device 120, rather than with the assistance of the monitoring device 110. For example, the NFC device tapped by the NFC device 129 may provide data to the user device 120 directly (e.g., in response to the tap of the NFC device 129), such as the above-described URL, and the provided data may trigger presentation of the graphical user interface (e.g., the user device 120 may retrieve and present a web page associated with the received URL). Additional exemplary aspects of providing information to the user device 120 using taps and NFC devices are described in more detail below.

In an aspect, the graphical user interface may prompt the user for access credentials, such as a username and password. The user may provide credential information via inputs to the graphical user interface and the credential information may be received by the monitoring device 110. In some aspects, an NFC device may be used to provide the access credentials. For example, the user device 120 may be a tablet computing device or other type of user device and the access credentials may be provided by tapping a smart card having an NFC device to the NFC device 129. Once received, the monitoring device 110 may authenticate the credential information and successful authentication of the credential information may unlock or provide access to additional functionality of the application, such as functionality that may be used to interact with and control one or more of the instruments 140, 160. In addition to unlocking or providing access to the additional application functionality and/or additional information about the item(s) 130, the monitoring device 110 may associate the item 130 with the user. Associating the user with the item 130 may include recording information to a database stored in the memory of the monitoring device 110 (e.g., the database(s) 118) to indicate the user has checked out the item 130, or a quantity of the item 130 from the storage facility.

Once checked out, the user may take the item 130 from the storage location to another location within the monitored environment, such as a location corresponding to the instrument 140. Upon arriving at the location of the instrument 140, the user may tap the NFC device 129 (or an NFC device associated with the item) to the NFC device 142 associated with the instrument 140 or otherwise bring the item (or the NFC device 129) in proximity of (e.g., within 1 cm, within 1-4 cm, within 1-10 cm, etc.) the NFC device 142. It is noted that, if desired, the location corresponding to the instrument 140 may also include an NFC device similar to the NFC device 190, such as an NFC device at an entrance to the room where the instrument 140 is located. The NFC device 129 may be used to interact with the NFC device at the entrance to the room (e.g., to indicate the location of the user and the item(s) 130 checked out by the user to the monitoring device 110 or another device, or to allow the user to gain entry into the room). This tap may be detected by the monitoring device 110 and recorded to the database (e.g., the database(s) 118), such as to update the database to indicate that the user and the item 130 are present at the location corresponding to the instrument 140. Tracking the location of the user and the item(s) checked out to the user in this manner may improve the overall security of the monitored environment and ensure that appropriate safety measures are followed. For example, the monitored environment could be a laboratory where contagions are stored and studied. The ability to identify which scientists have checked out different ones of the contagions being studied, where those persons conducted different tests or analysis (e.g., via taps to instruments used during testing, taps to NFC devices permitting entry into different rooms of the facility, etc.), or other types of information may improve the ability of the system 100 to monitor environments and track movement of persons and items within the monitored environments, as well as tracking devices that the user interacted with during the testing. This may enable improved enforcement and auditing of safety protocols or other operational metrics for laboratories and other types of monitored environments. For example, where a scientist is found to have not followed appropriate handling procedures, the database logs of the locations that scientist visited while having the item checked out may be identified, as well as any other persons that may have been near the scientist or that used the same instruments after the scientist. This information may also enable interested parties to determine whether other personnel of the monitored environment were present in each of the areas where the item was handled and may also enable identification of any persons that may be at risk due to the handling procedures that were not followed. It is noted that the non-limiting example of being able to track the location of persons, equipment (e.g., instruments, etc.), and items in a monitored environment by logging interactions with NFC devices is just one of the advantages provided by aspects of the present disclosure and that additional benefits and improvements provided by embodiments of the present disclosure are described in more detail below.

In addition to tracking the flow of items and users, as well as equipment and locations where the users and items were present, within the monitored environment via taps of NFC devices, the monitoring device 110 may also be configured to obtain data (e.g., one or more readings) from instruments within the monitored environment either directly or indirectly. To illustrate, a first tap of the NFC device 129 to an NFC device associated with an instrument may facilitate logging (e.g., by the monitoring device 110) of the location of the item 130 and the user handling the item, a subsequent tap of the NFC devices (e.g., the NFC devices associated with the instrument and the user device 120) may be used to trigger transmission of information. For example, the instrument 140 may be a scale. The monitoring device 110 may be communicatively coupled to the scale (e.g., via the network(s) 170 or a device configured to read an output of the scale) and may detect that the scale has an item placed on it (e.g., by reading an output of the scale and detecting that the scale does not read zero). Subsequently, the monitoring device 110 may record the weight to the database 118. In some aspects, the monitoring device 110 may delay recording the reading for a period of time, such as to allow the weight to stabilize. In additional or alternative aspects, the user may tap the NFC device 142 of the instrument 140 with the NFC device 129 of the user device 120 an additional time to cause the monitoring device 110 to record the weight (e.g., a first tap to signify to the monitoring device 110 that the user is at the scale and a second tap to signify to the monitoring device 110 that weight measured by the scale is ready to be read out).

Additionally or alternatively, the graphical user interface of the application presented at the display of the user device 120 may present a selectable element (e.g., a button or icon) or other technique (e.g., data entry field(s), etc.) to the user and the user may interact with the graphical user interface to cause the monitoring device 110 to record the weight. For example, the graphical user interface may include a button configured to transmit a control signal to the monitoring device 110 to cause the monitoring device 110 to read the output of the scale. When the user activates the button, the graphical user interface may transmit, via a call initiated by the application (e.g., an application programming interface call, an HTTP GET command, etc.). The monitoring device 110 may receive the control signal and then read the output of the scale via the one or more networks 170 (e.g., using the HTTP GET command or another technique). In an aspect, the control signal may include information that identifies the scale, such as an identifier included in a URL obtained by the user device 120 upon tapping the NFC device associated with the scale, and the HTTP GET command may be configured to request the weight from the scale based on the information identifying the scale.

As another non-limiting example, the graphical user interface may include a data entry field for inputting the weight reading output by the scale. The user may read the weight output by the scale and then input the weight into the data entry field of the graphical user interface application and click a submit button. Upon clicking the submit button of the graphical user interface, the input weight may be transmitted to the monitoring device 110 (e.g., via an HTTP POST command, etc.) and recorded in the one or more databases 118. In still additional or alternative aspects, the graphical user interface presented at the user device 120 may prompt the user to record the weight information and the user may manually input the weight into the graphical user interface. Once input to the graphical user interface, the weight information may be stored at the user device 120 (e.g., at a database stored at the memory 124) and later uploaded to the monitoring device 110 and recorded to the database 118. It is noted that the ability to record measurements or other types of information at the user device 120 and then sync that information to the monitoring device 110 at a later time may be particularly useful for laboratory environments where wireless communication capabilities may be limited or blocked (e.g., to prevent interference, noise, or other types of abnormalities with respect to instruments and other equipment present in the laboratory environment).

When the user is finished interacting with the instrument 140, the user may tap the NFC device 129 to, or bring the NFC device 129 within proximity of the NFC device 142. This tap may signify that the user is finished interacting with the instrument 140. As described above, the tap may be used to trigger transmission of information to the monitoring device 110 (e.g., via transmission of a control signal, directly via the one or more networks 170, or another technique). Upon completing use of the instrument 140, the user may return the item 130 to the storage facility, or the user may take the item 130 to the instrument 160 where additional actions may be performed with respect to the item 130, as described above. If the item 130 is returned to the storage facility, the user may tap NFC device 132 associated with the item 130 with the NFC device 129 (or bring the NFC devices in proximity) to check in the item 130. The monitoring device 110 may detect that the item has been checked in using one of the techniques described herein and may record, at the database 118, that the item 130 was checked in.

If, however, the user took the item 130 to the instrument 160, the user may tap the item 130 (or the NFC device 129 of the user device 120) with the NFC device 150, which may be located proximate to the instrument 160. As described above, the tapping of the NFC device 150 may be detected by the monitoring device 110 and the database 118 may be updated to reflect that the item 130 and/or the user is present at the instrument 160. The user may interact with the item 130 and the instrument 160 to perform one or more operations supported by the instrument 160 and the monitoring device 110 may obtain additional information from the instrument 160 and/or the application, which may be recorded to the database 118, as described above. Once the user has finished with the instrument 160, the user may return the item 130 to the storage facility, as described above, or may interact with additional instruments (not shown in FIG. 1 for simplicity of the drawing) with respect to the item 130.

As shown above, the system 100 provides for rapid interaction and monitoring of an environment in a manner that is more robust than just monitoring the location of items. Instead, the system 100 provides for dynamic and interactive monitoring of items within an environment, where interaction between NFC devices may cause information to be presented to or captured from the user and/or instruments and devices present in the environment. Such capabilities eliminate the need to carry or provide computing devices such as laptop or desktop computing devices within the environment and minimize the burden on the users.

In addition to the functionality described above, the databases maintained by the monitoring device 110 may include a database configured to store mapping data for the plurality of NFC devices present in the environment. The mapping data may include information that maps each tap of a respective NFC device of the plurality of NFC devices to an action. The actions may include one or more of: obtaining data from one or more instruments within the environment, providing data to the graphical user interface, configuring one or more devices within the environment, and generating an alert. For example, upon a first tap of the NFC device associated with the instrument 140, the monitoring device 110 may transmit a signal to the instrument 140 instructing the instrument to zero the scale (e.g., to ensure a proper reading is obtained). As another example, the instrument may be coupled to another component, such as a source of gas that may be used to heat at least a portion of the instrument, and the monitoring device 110 may control one or more valves to allow the gas to flow from the source to the instrument.

In some aspects, the mapping data for at least one NFC device of the plurality of NFC devices may include a sequence of two or more taps and each tap of the two or more taps may be mapped to a different action. To illustrate using the gas flow control in the example above, a first tap of the NFC device may activate the valve to allow gas to flow to the instrument and a second tap may activate an ignition switch to ignite the gas and initiate heating of at least the portion of the instrument. Alternatively the first tap may activate the value to allow the gas to flow and the ignition switch to ignite the gas may be activated automatically to prevent a possible situation where the user forgets to activate the ignition switch, thereby allowing excess gas to be released into the environment and creating a potentially hazardous condition.

An exemplary and non-limiting example of techniques for utilizing multiple taps to control processes in a laboratory environment according to the concepts disclosed herein is shown below in Table 1. In Table 1, pieces of equipment present in a laboratory environment are shown, such as the above-described instrument 160, the valve, and the ignition switch. The user may tap the NFC device 129 to the NFC device 150 associated with the instrument 160, which may provide a URL to the user device 120. As described above, the URL (e.g., http://domain.is/instrument160) may be received at the user device 120 and displayed in an application, such as a web browser, of the user device 120. After authentication of the user, the NFC device 129 may be tapped with the NFC device 150 a second time (e.g., tap 2 in Table 1). The second tap may be associated with actions corresponding to the valve and the ignition switch. For example, upon the second tap, the user may be prompted to perform the actions of opening the valve and activating the ignition switch. Additionally or alternatively, these actions may be performed automatically via control signals provided to the monitoring device 110, as described above. When the user is finished with the instrument 160, or at least done using the gas provided via the valve, the NFC device 129 may again be tapped to the NFC device 150 (e.g., tap 3 of Table 1), which may prompt the user to close the valve and make sure that the ignition switch is off. It is noted that in some implementations the actions associated with the third tap may be performed automatically as described above.

TABLE 1

| Device ID | URL | Tap # | Action |
|---|---|---|---|
| Instrument_160 | http://domain.is/instrument160 | 1 | Display web page |
| Instrument_160 | http://domain.is/instrument160 | 2 | Open Valve_1; activate Ignition_Switch_1 |
| Valve_1 | http://domain.is/valve_1 | | |
| Ignition_Switch_1 | http://domain.is/ignition_switch_1 | | |
| Instrument_160 | http://domain.is/instrument160 | 3 | Close Valve_1; Turn off Ignition_Switch_1 |

As shown in Table 1 above, URLs may be associated with each piece of equipment within a laboratory or other monitored environment and may enable various actions to be performed automatically (e.g., using control signals initiated via a web page and taps of NFC devices) or may enable prompts to be provided to a user to provide instructions on performing the actions manually. As each of the actions is performed, the monitoring device 110 may record the actions, equipment identifiers, and other information at the database 118 (e.g., via information input to a web page, via control signals provided in response to communication between different NFC devices, or other techniques disclosed herein). Additionally or alternatively, the information may be recorded to the databases 118 at a later time, such as when the user device 120 can sync with the monitoring device 110.

In addition to monitoring the instruments, items, and users within the environment, the monitoring device 110 may also monitor the status of other components of the environment, such as to monitor a status of any consumables (e.g., gas, etc.) utilized by the instruments, and may generate alerts based on the monitoring. For example, when a tap of an NFC device controlling the valve to the gas is initiated by the NFC device 129, a control signal may be provided to the monitoring device 110 to check the supply of the gas. If, at the time the tap is initiated, the supply of gas at the gas source is insufficient to utilize the instrument for a complete (or average duration) test run, the monitoring device 110 may notify the user that there are insufficient resources to use the instrument and may not activate the valve to supply the gas to the instrument. As an additional example, all or some of the items 130 may be consumed during use by the user, such as reagents or other chemicals that may be mixed, burned, or otherwise transformed to a state that is not suitable for returning to the storage facility once the user has completed testing or other operations involving the item(s). In an aspect, the monitoring device 110 may determine a current state of the items 130 (e.g., quantities on hand) based on information input to the graphical user interface by the user when checking out the items. For example, when the user taps the NFC device 129 to the NFC device 132 associated with an item that is checked out, a URL may be received at the user device 120 and a web page may be displayed. The web page may prompt the user to input the quantity of the item being checked out, such as to indicate number of units of the item, a weight of the item, a volume of the item (e.g., milliliters (mL), liters (L), and the like), or other metrics that may indicate the quantity of items being removed from the storage facility. The monitoring device 110 may receive information associated with those inputs and use that information to track the on-hand quantities of the items 130 held in the storage facility. Similar to the example above, the monitoring device 110 may automatically place orders, or prompt a user to place an order, when quantities of the items 130 fall below a threshold quantity. It is noted that the specific examples provided herein are provided for purposes of illustration, rather than by way of limitation and that other types of resources, components, and instruments may be monitored in accordance with aspects of the present disclosure.

As described above, some actions may involve presenting data at the user device 120 (e.g., within the graphical user interface), rather than controlling or configuring the instrument automatically. Additionally, multiple actions may be associated with a single tap, such as to present information at the graphical user interface concurrently with controlling or configuring the instrument (e.g., providing instructions for performing a test using the instrument at the graphical user interface while concurrently configuring the instrument to perform the test). In an aspect, different items may be associated with different configurations of the instrument(s). To illustrate, an instrument to perform a stress test on a material may be configured to apply different levels of stress to the material depending on whether the material is metal or plastic. The particular configuration of the instrument may be determined by the monitoring device 110 based on the item that is being tested, which may be determined based on the NFC device that was tapped to an NFC device corresponding to the instrument (e.g., the NFC device 129 or another NFC device). Additionally or alternatively, when an item is checked out it may be placed in a container and the container may have an NFC device disposed thereon or otherwise integrated with the container. The user may tap the NFC device 129 to the container and to the NFC device 132 corresponding to the item to associate the item with the container. Once such an association is made, the user device 120, the item 130, and the container may be linked, thereby enabling the user to tap the NFC device of the container to the NFC devices within the environment, such as the NFC devices 142, 150 corresponding to the instruments 140, 160. It is noted that when NFC devices for containers are tapped, the linking between the item(s), the container(s), and the user device 120 may enable the graphical user interface presented at the display device of the user device to display the appropriate information even though the NFC device 129 was not necessarily tapped to the instrument's NFC device.

In addition to providing functionality specific to the user and the item(s) checked out to the user, the monitoring device 110 may be configured to provide other types of information to users. For example, the monitoring device 110 may be configured to provide or present information indicating locations of a plurality of items within the environment and users associated with each item of the plurality of items at a graphical user interface. For example, the monitoring device 110 may maintain a map of a facility and locations of the instruments and storage locations for items may be marked on the map. As the various NFC devices are tapped within the system 100, the monitoring device 110 may associated with users and items with the different locations where the NFC devices are interacting, thereby allowing other users with appropriate permissions to view a current state of the instruments and the environment, such as to see if an instrument is free and available for use, what items are present within the environment, where particular users are located within the environment, or other types of information. In an aspect, this information may be used to audit how items and users moved within the environment, such as to determine which users were present in the environment at which times and what items were present. The monitoring device 110 may be configured to display the location information at the user device 120 (or another appropriate device of the system 100) and may even play the information back at a desired speed, such as to display a representation of the movement of items by users from the storage facility to different locations within the environment.

In an aspect, the monitoring device 110 may provide additional types of auditing functionality. To illustrate, the monitoring device 110 may track information specific to the checked out items 130 to enable auditing of the items. As a non-limiting example, a pharmaceutical company may manufacture products (e.g., prescription medication, over-the-counter medications, or other products) using a set of ingredients. The ingredients may be stored as the items 130 and may have different information associated with them, such as the supplier from which they were obtained, the date they were obtained, the expiration date, the batch or lot number of the item(s), or other types of information. As the items 130 are checked out the monitoring device 110 may record this information to the database 118. Such information may later be used to identify products that were manufactured using the checked out items 130, such as if a recall needs to be issued because it is discovered that a particular ingredient used to manufacture the product was defective or contaminated or for some other reason. Additionally, this information may be used to establish chain of custody and prove that a product was not manufactured with defective or contaminated ingredients. For example, the monitoring device 110 may receive an audit request that includes parameters for a manufactured product, where the parameters may indicate the date of manufacture for the product, the ingredients used to make the product, or other types of information. The monitoring device 110 may then extract the records from the database 118 based on the parameters and generate a report that establishes chain of custody for each ingredient from the time the ingredient(s) arrived at the facility to their use in manufacture of the product. The report may also indicate the users that interacted with the ingredients, the instruments or equipment used to manufacture the product, or other types of information that may be used to evaluate the fitness of the product for public consumption. It is noted that current techniques are incapable of providing this type of information and represents a significant challenge in many industries where tracking and monitoring of product manufacturing processes are regulated, such as the pharmaceutical industry, the supplement industry (e.g., vitamins, etc.), and other industries. Thus, the ability to audit aspects of the manufacturing process and establish chain of custody and other details of the manufacturing process represents a significant advantage over current industry practices. Additionally, it is noted that the auditing operations described above have been provided for purposes of illustration, rather than by way of limitation and that monitoring devices 110 of embodiments may be configured to provide other auditing functionality in addition to the specific examples described above.

As briefly described above, tapping of NFC devices may involve the exchange of data, which may include URLs (or Uniform Resource Identifiers (URIs)). In some aspects, URLs or URIs may be used to facilitate at least a portion of the interactive features of the system 100. For example, to present information at the graphical user interface displayed at the user device 120, an NFC device (e.g., one or more of the NFC devices shown in FIG. 1) may provide a URL to the user device 120 via the data exchanged when the user device 120 is tapped to the respective NFC device, as described above. The URL may cause the user device 120 to navigate a browser-based application to a particular web page, which may be monitored by the monitoring device 110. Some of the information accessible via the web page may be public while other information may be private (e.g., the information may only be accessed upon successful validation of the above-described credential information. Users of the system 100 may be associated with different access permissions, which may enable the users to access different portions of the information accessible via the web page and/or enable the users to utilize one or more of the various instruments present within the environment.

To illustrate, an administrator of the system 100 can configured access credentials for the different users of the system 100 to authorize the different users to access some portions of the facility, but not others, or to authorize the users to operate different ones of the instruments and equipment within the monitored environment. As an example, many users may have credentials that enable them to utilize a particular instrument or piece of equipment, but a smaller number of user may be authorized to calibrate the particular instrument or piece of equipment, or perform maintenance on the equipment. When users authorized to perform special tasks with respect to an instrument tap their NFC device to the NFC device of the instrument, calibration functionality may be accessed, whereas users that do not possess calibration credentials may not be able to access the calibration functionality.

In addition to utilizing the credential information to access to physical locations, as well as equipment/instruments and their functionality, the credential information may also be utilized to control access to data captured during use of the equipment and instruments. For example, each user may configure whether to make their data public (e.g., accessible by any other users of the system 100) or private (e.g., only accessible to the user that created the data or an authorized set of users). In addition to enabling the users to control access permissions to their data, the system 100 may also permit system administrators to configure permissioned access to data. For example, a facility operator may allow multiple different entities to utilize the facilities where the instruments and equipment are located or a manufacturer may produce products for many different third party companies. The facility operator may designate permissions to ensure that data of one of the entities sharing the facility monitored by the monitoring device 110 is not accessible to other entities sharing the facility or to ensure that data associated with manufacture of a product for one entity is not shared with another entity that utilizes the facility to manufacture products.

As shown above, the system 100 provides numerous advantages over existing systems for monitoring environments. Notably, the system 100 may be particularly suited for laboratory and other types of testing environments. For example, some laboratories handle hazardous substances, such as viruses and other pathogens, that may cause serious harm if not handled properly. The system 100 may be used to monitor the handling and testing of such substances and prompt users involved in the testing of the substances with instructions and guidance to ensure that they are handled in a safe manner. The ability to view all items within such environments may also be used to verify regulatory compliance, such as to verify that items are not brought into prohibited areas of the environment, and to track the handling of the items within the environment so that if an issue arises any users that have handled items related to the issues can be identified.

Referring to FIG. 2, a block diagram illustrating additional aspects of the present disclosure are shown. In FIG. 2, a facility location 230 is shown. The facility location 230 may be a building or a room within a building, such as a laboratory. As shown by arrow 202, to gain access to the facility location 230, a user may bring an NFC device 210 in proximity to or tap an NFC device 220. The NFC device 210 may include devices that are the same as or similar to the NFC device 129 of FIG. 1. The NFC device 220 may correspond to an NFC device that controls a door or otherwise controls entry into the facility location 230. As described above, when the tap 202 occurs, a monitoring device (not shown in FIG. 2) may detect that the user is attempting to gain access to the facility location 230. If the user is authorized, a lock or other mechanism may be activated to permit access to the facility location 230 by the user. If the user is not authorized, information may be presented at a user device associated with the NFC device 210 or another location to indicate the access to the facility location 230 by the user is not authorized.

Assuming the user is authorized to enter the facility location, the user may tap the NFC device 210 to an NFC device 238, as shown by arrow 204. As explained above, the tap 204 may cause information to be presented at the user's device, such as via a URL provided by the NFC device 238. The information may be presented to the user via a web browser application of the user device, as described above, and may prompt the user with information about an instrument 232. Utilizing the information presented via the web browser application, the user may perform one or more operations with the instrument 232 to perform tests or other processes involving an item 234. In an aspect, the instrument may be communicatively coupled to a computing device 236. The computing device 236 may be configured to detect the tap 204 and may initialize the instrument 232 for use by the user, such as to turn the instrument on and configure one or more parameters of the instrument. In an aspect, the configuration of the instrument 232 may be based, at least in part, on the item 234. For example, the tap 204 may provide credential information to the NFC device 238 and the credential information may be provided to the computing device 236. The computing device 236 may then retrieve information from a monitoring device (not shown) that indicates items checked out to the user, such as the item 234. The computing device 236 may then determine a configuration of the instrument 232 that is appropriate for the item 234 and may initialize the instrument 232 with operational settings according to the determined configuration. In a non-limiting example, initialization may include zeroing a weight reading (e.g., when the instrument 232 is a scale) or heating the instrument to a threshold temperature (e.g., if the instrument is a chemical vapor deposition (CVD) device).

Referring to FIG. 3, a block diagram illustrating aspects of controlling an instrument in accordance with aspects of the present disclosure is shown. In FIG. 3, an NFC device 310, a computing device 320, and an instrument 330 are shown. The computing device 320 may include one or more processors (not shown in FIG. 3 for simplicity of the drawing) and a memory 322. The memory 322 may store instructions 324 that may be executed by the one or more processors to perform the operations described in connection with the computing device 320.

The NFC device 310 may correspond to the instrument 330 and may be configured to provide NFC data 312 to the computing device in response to a tap 304 of the NFC device 310 by an NFC device 302. The NFC device 302 may be an NFC device that is the same or similar to the NFC device 129 of FIG. 1. The NFC data 312 may include credential information, such as access credentials of the user associated with the NFC device 302. In response to the tap 304 of the NFC device 310, the computing device 320 may provide commands 326 to the instrument 330. The commands 326 may control operational settings of the instrument 330, as described above, or may control a particular functionality of the instrument 330, such as to activate a particular function of the instrument 330 or other operations. In response to one or more of the commands 326, the instrument 330 may provide data 332 to the computing device 320. As described above with reference to Table 1, different taps may be configured to control different operations of the instrument 330 and/or other devices or equipment (not shown in FIG. 3).

The computing device 320 may be configured to provide the data 332 to the user's device (e.g., the device 120 of FIG. 1) and/or to one or more other devices, such as the monitoring device 110 of FIG. 1. It is noted that using a computing device, such as the computing device 320, to interact with the instrument 330 may enable network communication with the monitoring device without incurring the potentially negative effects of wireless communication networks (e.g., via wired communication links), which may minimize the noise and interference that may otherwise be present, thereby facilitating automatic capture of the data 332 by the monitoring device. However, as explained above, the computing device may simply display the data 332 so that the user can record the data 332 at the wen-browser application and may sync the data 332 to the monitoring device at a later time in some embodiments.

Referring to FIG. 4, a block diagram illustrating aspects of controlling an instrument in accordance with aspects of the present disclosure is shown. In FIG. 4, an NFC device 410, the computing device 320 of FIG. 3, and an instrument 420 are shown. Unlike the exemplary embodiment of FIG. 3, in FIG. 4, the NFC device 410 corresponds to the instrument 420 and is configured to provide NFC data 412 to the instrument 420 (rather than the computing device 320, as in FIG. 3) in response to a tap 404 of the NFC device 410 by an NFC device 402. The NFC device 402 may be an NFC device that is the same or similar to the NFC device 129 of FIG. 1. The NFC data 412 may indicate that the tap 404 has occurred.

The instrument 420 may be configured to perform different operations in response to different taps 404. For example, the instrument 420 may be a scale and a first tap may zero the scale, while a second tap may trigger a measurement (e.g., of a weight of an item placed on the scale) by the scale. Similar to the embodiment illustrated in FIG. 3, the instrument 420 may be configured to output data 422, such as readings from the scale or temperature measurements by a temperature instrument (e.g., a thermometer), to the computing device 320. The computing device 320 may then output or display the data 422 so that the user can manually input the data into the web browser application, as described above. Additionally or alternatively, the computing device may transmit the data 522 to a monitoring device (e.g., the monitoring device 110 of FIG. 1).

Referring to FIG. 5, a block diagram illustrating aspects of controlling an instrument in accordance with aspects of the present disclosure is shown. In FIG. 5, an NFC device 510, the computing device 320 of FIG. 3, and an instrument 520 are shown. The embodiment illustrated in FIG. 5 is similar to the embodiment illustrated in FIG. 4, except that NFC device 510 is integrated with the instrument 520, rather than being disposed proximate to but external of (i.e., outside of a housing of) the instrument 520. The NFC device 510 may be configured to provide NFC data 412 to the instrument 520 (rather than the computing device 320, as in FIG. 3) in response to a tap 504 of the NFC device 510 by an NFC device 502. The NFC device 502 may be an NFC device that is the same or similar to the NFC device 129 of FIG. 1. The NFC data 412 may indicate that the tap 504 has occurred.

As in the embodiments illustrated in FIGS. 3 and 4, the instrument 520 may be configured to perform different operations in response to different taps 504. For example, the instrument 420 may be a scale and a first tap may zero the scale, while a second tap may trigger a measurement (e.g., of a weight of an item placed on the scale) by the scale. Similar to the embodiment illustrated in FIG. 3, the instrument 520 may be configured to output data 522, such as readings from the scale or temperature measurements by a temperature instrument (e.g., a thermometer), to the computing device 320. The computing device 320 may then output or display the data 522 so that the user can manually input the data into the web browser application, as described above. Additionally or alternatively, the computing device may transmit the data 522 to a monitoring device (e.g., the monitoring device 110 of FIG. 1).

Referring to FIG. 6, a block diagram illustrating aspects of controlling an instrument in accordance with aspects of the present disclosure is shown. In FIG. 6, an NFC device 610 and an instrument 620 are shown. The embodiment illustrated in FIG. 6 is similar to the embodiment illustrated in FIG. 5, except that NFC device 610 is configured to communicate data with a user device directly, rather than via a computing device (e.g., the computing device 320 of FIGS. 3-5). The NFC device 610 may be configured to provide data 612 to an NFC device 602, which may be an NFC device that is the same or similar to the NFC device 129 of FIG. 1, in response to a tap of the NFC device 610 by the NFC device 602. The NFC data 612 may include information associated with the instrument 620, such as the URL (or URI) described above, and/or may also include data generated by the instrument.

As described above, the instrument 620 may be configured to perform different operations in response to different taps of the NFC devices 602, 610. For example, the instrument 620 may be a scale and a first tap may zero the scale, while a second tap may trigger a measurement (e.g., of a weight of an item placed on the scale) by the scale. Similar to the embodiment illustrated in FIG. 3, the instrument 520 may be configured to output the data 622, such as readings from the scale or temperature measurements by a temperature instrument (e.g., a thermometer), to the user device associated with the NFC device 602 (e.g., to provide the measurement) in response to another tap (e.g., one tap to trigger measurement and another tap to receive the measurement at the NFC device 602). It is noted that in some aspects, the NFC device 602 may be tapped to trigger the measurement and instead of performing another tap to receive the measurement, the user may manually record the measurement in the graphical user interface of the web browser, as described above.

Referring to FIG. 7, additional aspects of controlling instruments according to the present disclosure is shown. In FIG. 7, an instrument 710 is shown. The instrument 710 may include two or more NFC devices, such as NFC devices 712, 714. It is noted that while FIG. 7 illustrates two NFC devices, in some embodiments an instrument may include or be associated with more than two NFC devices. In some implementations, the NFC device 712 may be configured to control commands provided to the instrument 710 and the NFC device 714 may be configured to reverse a command. For example, if the NFC device of the user is a smartwatch, the user may inadvertently bring the NFC device in proximity to the NFC device 712, which may trigger a command to the instrument when the user did not intend to provide such command. If this occurs, the user may bring the NFC device of the smartwatch in proximity of the NFC device 714 to undo the command. When the user is then ready to proceed with the command associated with the inadvertent tap, the user may then bring the NFC device of the smartwatch in proximity to the NFC device 712 of the instrument 710.

It is noted that other types of operations may be provided in implementations associated with instruments having multiple NFC devices. For example, in addition to the providing of commands and undoing of commands, additional NFC devices may be provided to control certain functionality of the instrument 710 or other devices that support operations of the instrument 710. For example, the NFC device 712 may be provided to control operational aspects of the instrument 710 and the NFC device 714 may be provided to undo operational controls as described above. An additional NFC device (not shown in FIG. 7) may be provided to control an external device that supports operations of the instrument 710, such as the valve or ignition switch described above with reference to Table 1. The user may tap the additional NFC device(s) to control their operation, such as to open/close the valve, activate the ignition switch, or other operations that may support functionality of the instrument 710. In some aspects, one or more of the NFC devices may act as an override or master control with respect to the instrument 710 and any supporting devices. For example, where the NFC devices for controlling the valve and ignition switch are provided, the user may tap the NFC device 712 when the user is finished using the instrument 710 and that tap may trigger the NFC device 712 (or the instrument 710) to provide control signals to close the valve and turn off the ignition switch. In this manner, the user may not have to tap multiple NFC devices to turn off the instrument 710 and shut down any supporting devices. It is noted that the exemplary functionality that may be provided via use of multiple NFC devices with respect to an instrument or piece of equipment has been provided for purposes of illustration, rather than by way of limitation and that other types of functionality and control may be provided depending on the particular piece of equipment and/or supporting devices involved in a particular use case.

Referring to FIG. 8, a flow diagram illustrating a method for dynamic and interactive monitoring of an environment in accordance with aspects of the present disclosure is shown as a method 800. In aspects, the method 800 may be performed by a monitoring device, such as the monitoring device 110 or the cloud-based monitoring device 180 of FIG. 1. Steps of the method 800 may be stored as instructions (e.g., the instructions of the monitoring device 110 of FIG. 1) that, when executed by one or more processors (e.g., the one or more processors of the monitoring device 110 of FIG. 1), cause the one or more processors to perform operations for monitoring an environment in accordance with the method 800.

At step 810, the method includes, detecting, by one or more processors of a monitoring device, a first tap of a first NFC device by a user device having an NFC capability. The first NFC device may correspond to an item (e.g., the NFC devices 132 of FIG. 1) and the user device (e.g., the user device 120 of FIG. 1) may correspond to a user that is checking items in and check items out of a storage facility. As described above, the monitoring device may associate the item with the user based on the first tap of the first NFC device by the user device. At step 820, the method 800 includes detecting, by the monitoring device, a first tap of a second NFC device by the user device. In an aspect, the second NFC device may be an instrument within an environment. At step 830, the method 800 includes associating, by the monitoring device, the user and the item with the instrument within the environment based on the first tap of the second NFC device. At step 840, the method 800 includes providing, by the monitoring device, information to a graphical user interface of the user device in response to detecting a first tap of a second NFC device by the user device. The information provided to the graphical user interface may be associated with functionality of the instrument within the environment, such as functionality for performing at least one operation with respect to the item. For example, as described above with reference to FIG. 1, the instrument may be a scale configured to weigh the item and the monitoring device may capture information associated with the weight of the item subsequent to detecting a particular tap of the second NFC device with the user device. It is noted that other types of devices and functionality may be provided according to embodiments of the present disclosure and discussion of specific devices and functionality with reference to the method 800 has been provided for purposes of illustration, rather than by way of limitation. It is also noted that the method 800 may also include other functionality and steps consistent with the description of the operations of the system 100 of FIG. 1 or the concepts illustrated and described with reference to FIGS. 2-7.

Figure 9:
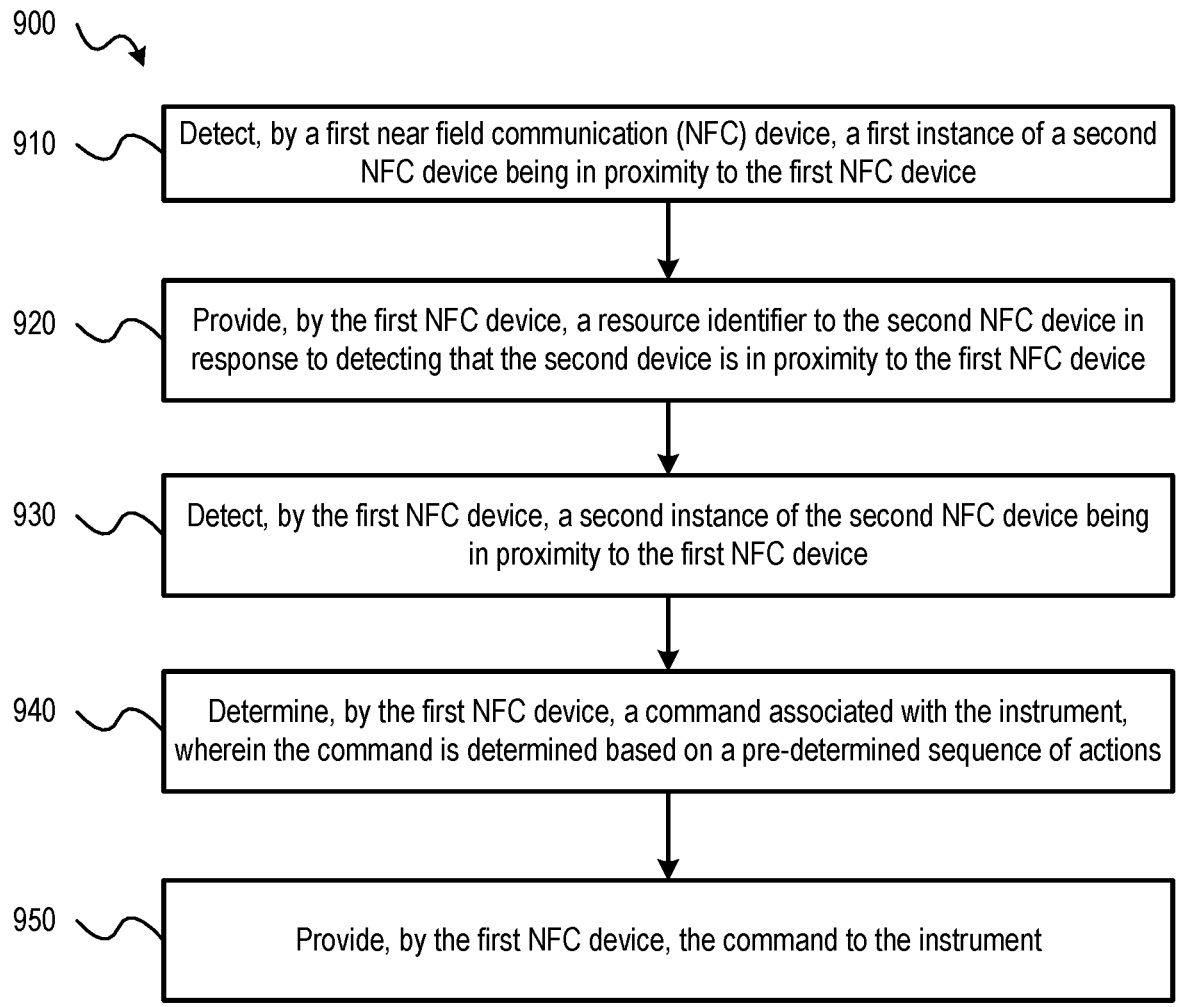
FIG. 9 is a flow diagram illustrating a method for dynamic and interactive control of devices within an environment in accordance with aspects of the present disclosure.

Referring to FIG. 9, a flow diagram illustrating a method for controlling an instrument in a monitored environment in accordance with aspects of the present disclosure is shown as a method 900. In aspects, the method 900 may be performed by a system, such as the system 100 of FIG. 1. In some aspects, the method 900 may be performed by an NFC device, such as the NFC devices of FIGS. 1-7. In some aspects, steps of the method 900 may be stored as instructions that, when executed by one or more processors, cause the one or more processors to perform operations for monitoring an environment in accordance with the method 900.

At step 910, the method 900 includes detecting, by a first near field communication (NFC) device, a first instance of a second NFC device being in proximity to the first NFC device. As described above with reference to FIGS. 1-7, the first NFC device may be associated with an instrument and the second NFC device is associated with a user device (e.g., the user device 120 of FIG. 1). At step 920, the method 900 includes providing, by the first NFC device, a resource identifier to the second NFC device in response to detecting that the second device is in proximity to the first NFC device. As described above, the resource identifier may include a URL or a URI, which may be used to display information at the user device.

At step 930, the method 900 includes detecting, by the first NFC device, a second instance of the second NFC device being in proximity to the first NFC device and at step 940, determining, by the first NFC device, a command associated with the instrument. As described above, different taps of the NFC devices may be associated with different commands to control operation of the instrument (or devices supporting operation of the instrument). In an aspect, the command may be determined based on a pre-determined sequence of actions, such as the actions illustrated in Table 1. Each action may be associated with a particular instance of the first NFC device being in proximity to the second NFC device (i.e., a particular tap in the sequence of taps).

At step 950, the method 900 includes providing, by the first NFC device, the command to the instrument. As described above, the command may be configured to control implementation of or cause execution of the action corresponding to the second instance of the first NFC device being in proximity to the second NFC device, such as to obtain a measurements, output the measurement, and the like. Additionally, in some aspects, the commands may include commands to control external devices that support operations of the instrument, such as the example provided above involving the valve and the ignition switch. It is noted that other types of devices and functionality may be provided according to embodiments of the present disclosure and discussion of specific devices and functionality with reference to the method 900 has been provided for purposes of illustration, rather than by way of limitation. It is also noted that the method 900 may also include other functionality and steps consistent with the description of the operations of the system 100 of FIG. 1 or the concepts illustrated and described with reference to FIGS. 2-7.

As shown above, embodiments of the present disclosure provide numerous advantages and improvements with respect to monitoring environments and controlling devices within the monitored environment. For example, the use of NFC devices to provide URLs (or URIs) that provide functionality for recording data obtained via the devices within the monitored environment may enable efficient data capture within the monitored environment and result in improved auditing capabilities. Moreover, the data capture techniques provided by the URLs may enable data to be captured in an environment where wireless networks may not be permitted (e.g., due to interference or other noise caused by such networks) and then the captured data may be synced to the to a central monitoring system (e.g., the monitoring device 110 of FIG. 1) at a later time, if desired. Additionally, the NFC devices may be used to perform hands-free interaction with the devices, which may improve safety, reduce the likelihood of contamination of the devices (e.g., for pharmaceutical or nutritional supplement use cases), or other benefits. Furthermore, by using a predetermined sequence of interactions between NFC devices, workflow controls may be enforced more readily, such as requiring that certain actions take place before further actions can be taken (e.g., due to the requirement that specific taps be tied to specific actions), which may be particularly suitable to manufacturing processes involving sequences of actions, such as may be found in pharmaceutical and nutritional supplement production processes or laboratory environments. It is noted that other advantages have been disclosed herein and the foregoing improvements have been provided for purposes of illustration, rather than by way of limitation.

It is noted that while aspects of the description above have been described with respect to use of NFC devices, other technologies, such as QR codes or other techniques that can encode information that may be accessed via a user device may be utilized for some of the above-described functionality, such as to provide the URLs or URIs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-9) may comprise processors, electronics devices, hardware devices, electronics components, logical circuits, memories, software codes, firmware codes, etc., or any combination thereof. In addition, features discussed herein relating to FIGS. 1-9 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-2) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system for providing interactive monitoring of an environment, the system comprising:
a first near field communication (NFC) device corresponding to an item;
a second NFC device associated with an instrument located within the environment; and
a monitoring device communicatively coupled to the first NFC device and the second NFC device via a network, wherein the monitoring device comprises one or more processors configured to:
detect a first tap of the first NFC device by a user device having an NFC capability;
associate the item with the user device based on the first tap of the first NFC device;
detect a first tap of the second NFC device by the user device;
perform a first action of a sequence of actions corresponding to the second NFC device in response to detecting the first tap of the second NFC device, wherein the first action is configured to associate the user device and the item with the instrument within the environment based on the first tap of the second NFC device; and
perform a second action of the sequence of actions corresponding to the second NFC device in response to detecting a second tap of the second NFC device, wherein the second action is configured to provide information to a graphical user interface of the user device in response to detecting the second tap of the second NFC device by the user device, wherein the information provided to the graphical user interface is associated with functionality of the instrument present within the environment, and wherein the instrument is configured to perform at least one operation with respect to the item.

2. The system of claim 1, wherein the one or more processors of the monitoring device are configured to:
obtain one or more readings from the instrument subsequent to the first tap of the second NFC device by the user device; and
store the one or more readings in a memory.

3. The system of claim 2, wherein the memory comprises one or more storage devices disposed in a cloud.

4. The system of claim 1, further comprising a database configured to store mapping data for a plurality of NFC devices,
the plurality of NFC including the first NFC device and the second NFC device,
wherein the mapping data comprises information that maps each tap of a respective NFC device of the plurality of NFC devices to an action selected from the group consisting of: obtaining data from one or more devices within the environment, providing data to the graphical user interface, configuring one or more devices within the environment, and generating an alert.

5. The system of claim 4, wherein the mapping data for at least one NFC device of the plurality of NFC devices comprises a sequence of two or more taps, wherein each tap of the two or more taps is mapped to a different action.

6. The system of claim 1, wherein the one or more processors of the monitoring device are configured to identify a user associated with the user device in response to a particular tap of a particular NFC device.

7. The system of claim 6, wherein identification of the user comprises:
initiating presentation of the graphical user interface at the user device;
receiving credential information via the graphical user interface; and
authenticating the credential information.

8. The system of claim 1, wherein the one or more processors of the monitoring device are configured to provide information indicating locations of a plurality of items within the environment and users associated with each item of the plurality of items via a graphical user interface.

9. The system of claim 1, wherein the one or more processors of the monitoring device are configured to generate a report based on information stored in a database, wherein the information stored in the database comprises information captured based on the at least one operation performed by the instrument, operations performed on one or more other instruments, or both, and wherein the report includes information tracking movement of the item within an environment, instruments performing operations with respect to the item, users associated with the item, or combinations thereof.

10. A method for controlling an instrument, the method comprising:
detecting, by a first near field communication (NFC) device, a first instance of a second NFC device being in proximity to the first NFC device, wherein the first NFC device is associated with an instrument and the second NFC device is associated with a user device;

providing, by the first NFC device, a resource identifier to the second NFC device in response to detecting the first instance of the second NFC device being in proximity to the first NFC device;

detecting, by the first NFC device, a second instance of the second NFC device being in proximity to the first NFC device;

determining, by the first NFC device, a command associated with the instrument, wherein the command is determined based on a pre-determined sequence of actions corresponding to the second NFC device, each action of the pre-determined sequence of actions associated with a particular instance of the second NFC device being in proximity to the first NFC device; and providing, by the first NFC device, the command to the instrument, wherein the command is configured to control implementation of an action corresponding to the second instance of the second NFC device being in proximity to the first NFC device.

11. The method of claim 10, further comprising:
detecting one or more additional instances of the second NFC device being in proximity to the first NFC device; and determining one or more commands based on the pre-determined sequence of actions and each of the one or more additional instances of the second NFC device being in proximity to the first NFC device.

12. The method of claim 11, wherein the one or more commands comprise a command to obtain a measurement by the instrument in response to a particular one of the one or more additional instances of the second NFC device being in proximity to the first NFC device.

13. The method of claim 12, wherein the one or more commands comprise a command to output the measurement obtained by the instrument in response to another particular one of the one or more additional instances of the second NFC device being in proximity to the first NFC device.

14. The method of claim 12, wherein the measurement is output to the user device, a monitoring device, or both.

15. The method of claim 11, wherein the one or more commands comprise a command to control a device external to the instrument, the device external to the instrument configured to provide functionality to support operations of the instrument.

16. The method of claim 10, further comprising:
detecting, by a third NFC device, a first instance of the second NFC device being in proximity to the third NFC device, wherein the third NFC device is associated with the instrument; and providing, by the third NFC device, a rescind command to the instrument, the rescind command configured to reverse the command provided to the instrument by the first NFC device in response to detection of the second instance of the second NFC device being in proximity to the first NFC device.

17. A non-transitory computer-readable storage medium storing instructions that, when executed by one or more processors, cause the one or more processors to perform operations for controlling an instrument, the operations comprising:

detecting a first instance of a second near field communication (NFC) device being in proximity to a first NFC device, wherein the first NFC device is associated with an instrument and the second NFC device is associated with a user device;

providing a resource identifier to the second NFC device in response to detecting the first instance of the second NFC device being in proximity to the first NFC device, wherein the resource identifier comprises a uniform resource locator (URL) or a uniform resource identifier (URI);

detecting a second instance of the second NFC device being in proximity to the first NFC device;

determining a command associated with the instrument, wherein the command is determined based on a pre-determined sequence of actions corresponding to the second NFC device, each action of the pre-determined sequence of actions associated with a particular instance of the second NFC device being in proximity to the first NFC device; and providing the command to the instrument, wherein the command is configured to control implementation of an action corresponding to the second instance of the second NFC device being in proximity to the first NFC device.

18. The non-transitory computer-readable storage medium of claim 17, the operations further comprising:
detecting a third instance of the second NFC device being in proximity to the first NFC device;

determining a second command based on the pre-determined sequence of actions and the third instance of the second NFC device being in proximity to the first NFC device, wherein the second command comprises a command to obtain a measurement by the instrument;

detecting a fourth instance of the second NFC device being in proximity to the first NFC device; and determining a third command based on the pre-determined sequence of actions and the fourth instance of the second NFC device being in proximity to the first NFC device, wherein the third command comprises a command to output the measurement obtained by the instrument to the user device, a monitoring device, or both.

19. The non-transitory computer-readable storage medium of claim 17, wherein the operations comprise:
detecting an additional instance of the second NFC device being in proximity to the first NFC device; and determining an additional command based on the pre-determined sequence of actions and the additional instance of the second NFC device being in proximity to the first NFC device, wherein the additional command comprises a command to control a device external to the instrument, the device external to the instrument configured to provide functionality to support operations of the instrument.

20. The non-transitory computer-readable storage medium of claim 17, wherein the resource identifier is configured to provide access to a web page, and wherein the web page comprises interactive elements for capturing data associated with operation of the instrument and provide information associated with an operational workflow of the instrument to a user corresponding to the user device.

* * * * *